US010715381B2

(12) United States Patent
Bhesania et al.

(10) Patent No.: US 10,715,381 B2
(45) Date of Patent: Jul. 14, 2020

(54) INTELLIGENT ROLE SELECTION FOR DUAL-ROLE DEVICES

(71) Applicant: Microsoft Technology Licensing, LLC, Redmond, WA (US)

(72) Inventors: Firdosh K. Bhesania, Kirkland, WA (US); Anthony Y. Chen, Bellevue, WA (US); Vivek Gupta, Bothell, WA (US); Andrea A. Keating, Seattle, WA (US); Randall E. Aull, Bothell, WA (US); Rahul Ramadas, Bellevue, WA (US); Robert E. Harris, Jr., Woodinville, WA (US); Jayson L. Kastens, Woodinville, WA (US); Philip A. Froese, Redmond, WA (US); Cong Yang, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/155,162

(22) Filed: Oct. 9, 2018

(65) Prior Publication Data
US 2019/0052525 A1 Feb. 14, 2019

Related U.S. Application Data

(63) Continuation of application No. 14/860,064, filed on Sep. 21, 2015, now Pat. No. 10,122,576.
(Continued)

(51) Int. Cl.
H04L 12/00 (2006.01)
H04L 12/24 (2006.01)
H04W 52/02 (2009.01)
H04W 84/20 (2009.01)

(52) U.S. Cl.
CPC ..... *H04L 41/0803* (2013.01); *H04W 52/0261* (2013.01); *H04W 84/20* (2013.01);
(Continued)

(58) Field of Classification Search
CPC .......... H04L 41/0803; H04W 52/0261; H04W 84/20; Y02D 70/00; Y02D 70/142; Y02D 70/144; Y02D 70/26; Y02D 70/164
(Continued)

(56) References Cited

U.S. PATENT DOCUMENTS

| 6,990,379 B2* | 1/2006 | Gonzales | H04L 12/2803 340/3.1 |
| 7,478,188 B2* | 1/2009 | Patton | H04L 12/66 710/300 |

(Continued)

FOREIGN PATENT DOCUMENTS

| CN | 103309823 A | 9/2013 |
| CN | 104335642 A | 2/2015 |

OTHER PUBLICATIONS

"Office Action Issued in Chinese Patent Application No. 201680016219. 8", dated Nov. 11, 2019, 15 Pages.
"Office Action Issued in European Patent Application No. 16708314. 6", dated Mar. 5, 2020, 5 Pages.
"Second Office Action and Search Report Issued in Chinese Patent Application No. 201680016219.8", dated Apr. 9, 2020, 19 Pages.

*Primary Examiner* — Frantz Coby
(74) *Attorney, Agent, or Firm* — Fiala & Weaver P.L.L.C.

(57) ABSTRACT

Embodiments described herein are directed to mechanisms that enable roles (e.g., host vs. function, power provider vs. power consumer, master vs. slave, server vs. client, source vs. sink, upstream vs. downstream) to be dynamically assigned between two interconnected dual-role devices in an intelligent and deterministic manner based on the available context on each device.

20 Claims, 8 Drawing Sheets

Related U.S. Application Data

(60) Provisional application No. 62/134,233, filed on Mar. 17, 2015.

(52) U.S. Cl.
CPC ............ *Y02D 70/00* (2018.01); *Y02D 70/142* (2018.01); *Y02D 70/144* (2018.01); *Y02D 70/164* (2018.01); *Y02D 70/26* (2018.01)

(58) Field of Classification Search
USPC ................... 709/203, 223, 224, 225, 226
See application file for complete search history.

(56) References Cited

U.S. PATENT DOCUMENTS

| | | | | |
|---|---|---|---|---|
| 8,595,725 | B2 * | 11/2013 | Tjia | G06F 9/5044 |
| | | | | 709/201 |
| 9,053,340 | B2 * | 6/2015 | Borzycki | G06F 21/6218 |
| 9,392,077 | B2 * | 7/2016 | Borzycki | G06F 21/6218 |
| 10,122,576 | B2 * | 11/2018 | Bhesania | H04L 41/0803 |
| 2004/0019732 | A1 * | 1/2004 | Overtoom | G06F 13/4022 |
| | | | | 710/313 |
| 2006/0065743 | A1 * | 3/2006 | Fruhauf | G06F 13/385 |
| | | | | 235/492 |
| 2015/0268688 | A1 * | 9/2015 | Leinonen | G06F 13/409 |
| | | | | 307/147 |
| 2016/0277235 | A1 * | 9/2016 | Bhesania | H04L 41/0803 |

\* cited by examiner

INTELLIGENT ROLE SELECTION FOR DUAL-ROLE DEVICES

CROSS-REFERENCE TO RELATED APPLICATIONS

This application is a continuation of U.S. patent application Ser. No. 14/860,064, filed Sep. 21, 2015, which in turn claims the benefit of U.S. Provisional Patent Application No. 62/134,233, filed on Mar. 17, 2015. The entirety of each of these applications is incorporated by reference herein.

BACKGROUND

An asymmetric bus protocol between two interconnected devices defines a relationship where a role is assigned to one device and a different role is assigned to the other device. Some examples of these role relationships include host vs. function, power provider vs. power consumer, master vs. slave, server vs. client, source vs. sink, upstream vs. downstream, etc. In cases where the two interconnected devices support both roles (i.e., the devices are dual-role devices), the role that each device should assume may not be obvious or even deterministic. In some cases, an incorrect assignment of roles can result in limited functionality or loss of functionality between the two devices. This problem becomes more apparent in the cases where the connectors and cables being used to connect two devices are symmetric. For example, the new USB Type C specification defines such symmetric cables and connectors.

SUMMARY

Embodiments described herein are directed to mechanisms that enable roles to be dynamically assigned to two interconnected dual-role devices in an intelligent and deterministic manner based on the available context on one or both devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the application and, together with the description, further serve to explain the principles of the embodiment and to enable a person skilled in the relevant art(s) to make and use the embodiments.

Figure 1:
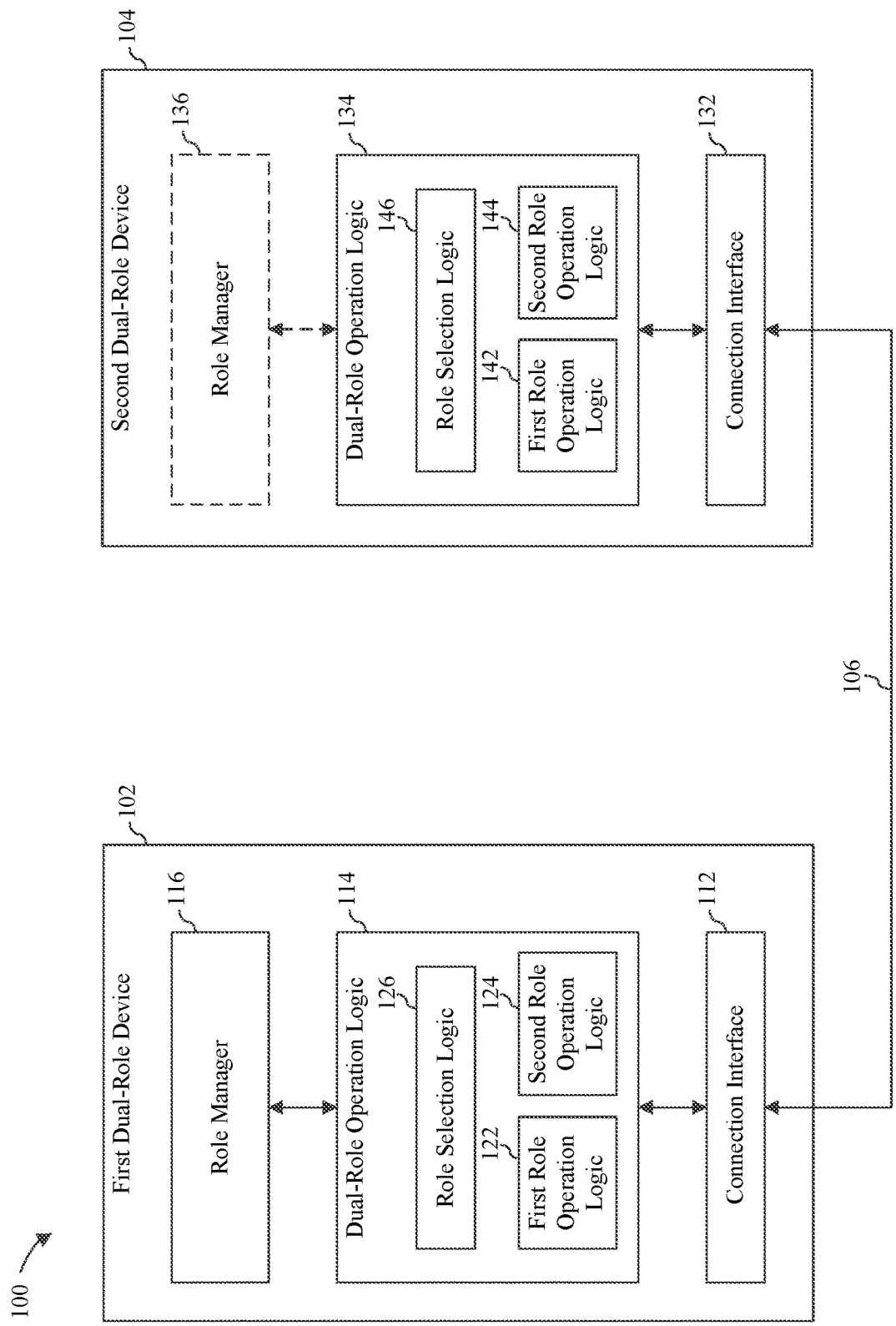
FIG. 1 is a block diagram of a system in which roles are dynamically assigned to two interconnected dual-role devices in an intelligent and deterministic manner based on the available context on one or both devices in accordance with an embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

As noted in the Background Section above, an asymmetric bus protocol between two interconnected devices defines a relationship where a role is assigned to one device and a different role is assigned to the other device. Some examples of these role relationships include host vs. function, power provider vs. power consumer, master vs. slave, server vs. client, source vs. sink, upstream vs. downstream, etc. In cases where the two interconnected devices support both roles (i.e., the devices are both dual-role devices), the role that each device should assume may not be obvious or even deterministic. In some cases, an incorrect assignment of roles can result in limited functionality or loss of functionality between the two devices. This problem becomes more apparent in the cases where the connectors and cables being used to connect two devices are symmetric. For example, the new USB Type C specification defines such symmetric cables and connectors.

Embodiments described herein provide a mechanism that dynamically assigns roles to two interconnected dual-role devices in an intelligent and deterministic manner based on the available context on one or both devices.

Some previous solutions have defined mechanisms for allowing dual-role devices to switch roles, but have not specified when these mechanisms should be used. Another previous solution determined the role based on the orientation of the cable. However this solution only works if the cables and connectors (or other mechanisms used to connect the devices together) are asymmetric and thus have a correct and incorrect orientation. Other previous solutions have assumed that devices are statically assigned a role and do not switch, even if the devices are dual-role capable.

Various example embodiments that provide a mechanism that dynamically assigns roles between two interconnected dual-role devices in an intelligent and deterministic manner based on the available context on one or both devices will be described below in Section II. Section III describes an example mobile device that may be used implement various embodiments. Section IV describes an example processor-based computer system that may be used to implement various embodiments. Section V describes some additional exemplary embodiments. Section VI provides some concluding remarks.

II. Example Embodiments that Dynamically and Intelligently Assign Roles to Two Interconnected Dual-Role Devices FIG. 1 is a block diagram of a system 100 in accordance with an embodiment in which roles are dynamically assigned to two interconnected dual-role devices in an intelligent and deterministic manner based on the available context on one or both devices. As shown in FIG. 1, system 100 includes a first dual-role device 102, a second dual-role device 104, and a connection 106 there between.

First dual-role device 102 and second dual-role device 104 may each comprise any one of a wide variety of electronic devices. By way of example only, each of first dual-role device 102 and second dual-role device 104 may comprise a desktop computer, a laptop computer, a tablet computer, a mobile phone (e.g., a smart phone), a portable media player, a gaming console, a wearable device or computer (e.g., a smart watch, a wearable fitness device or a head-mounted computer), an Internet of Things device, a personal navigation assistant, a camera, a computer peripheral, or any other electronic device that is capable of sending or receiving data and/or power to or from another device via a suitable connection. First dual-role device 102 and second dual-role device 104 may comprise the same or similar device types or different device types.

Connection 106 comprises a physical medium (or physical media) that enables data and/or power to be transferred between first dual-role device 102 and second dual-role device 104. Depending upon the implementation, connection 106 may comprise one or more wired and/or wireless connections.

As shown in FIG. 1, first dual-role device 102 comprises a connection interface 112 and dual role-operation logic 114. Connection interface 112 comprises a physical interface by which a connection with an external device may be achieved. In system 100, connection interface 112 of first dual-role device 102 is utilized to establish connection 106 to second dual-role device 104. In accordance with certain embodiments, connection interface 112 comprises a port that is operable to receive a connector that resides at one end of a cable. Such cable may also be connected to second dual-role device 104 either directly or indirectly (i.e., via one or more intervening devices or connections). In accordance with alternate embodiments, connection interface 112 comprises a wireless interface that is operable to communicate with external devices over the air. Such wireless interface may enable first dual-role device 102 to communicate with second dual-role device 104 either directly or indirectly (i.e., via one or more intervening devices or connections).

Dual-role operation logic 114 is logic that enables first dual-role device 102 to operate in either a first role or a second role with respect to its interaction with second dual-role device 104 via connection 106. In particular, dual-role operation logic 114 includes first role operation logic 122 that, when activated, enables first dual-role device 102 to operate in the first role with respect to its interaction with second dual-role device 104 via connection 106 and second role operation logic 124 that, when activated, enables first dual-role device 102 to operate in the second role with respect to its interaction with second dual-role device 104 via connection 106. Depending upon the implementation, the first and second roles may respectively comprise, for example, host and function, power provider and power consumer, master and slave, server and client, source and sink, upstream and downstream, etc. However, these examples are by no means limiting and the first and second roles may comprise other roles depending upon the implementation.

Dual-role operation logic 114 further comprises role section logic 126 that selectively activates either first role operation logic 122 or second role operation logic 124, thereby enabling first dual-role device 102 to operate in either the first role or the second role with respect to its interaction with second dual-role device 104 via connection 106.

As further shown in FIG. 1, second dual-role device 104 comprises a connection interface 132 and dual role-operation logic 134. Connection interface 132 comprises a physical interface by which a connection with an external device may be achieved. In system 100, connection interface 132 of second dual-role device 104 is utilized to establish connection 106 to first dual-role device 102. Like connection interface 112, connection interface 132 may comprise a port that is operable to receive a connector of a cable that is connected either directly or indirectly to first dual-role device 102 or a wireless interface that is operable to communicate either directly or indirectly with first dual-role device 102.

Dual-role operation logic 134 is logic that enables second dual-role device 104 to operate in either the first role or the second role with respect to its interaction with first dual-role device 102 via connection 106. In particular, dual-role operation logic 134 includes first role operation logic 142 that, when activated, enables second dual-role device 104 to operate in the first role with respect to its interaction with first dual-role device 102 via connection 106 and second role operation logic 144 that, when activated, enables second dual-role device 104 to operate in the second role with respect to its interaction with first dual-role device 102 via connection 106.

Dual-role operation logic 134 further comprises role section logic 146 that selectively activates either first role operation logic 142 or second role operation logic 144, thereby enabling second dual-role device 104 to operate in either the first role or the second role with respect to its interaction with first dual-role device 102 via connection 106.

As still further shown in FIG. 1, first dual-role device 102 further includes a role manager 116. Role manager 116 comprises logic that is operable to obtain capability and/or operational state information associated with one or both of first dual-role device 102 and second dual-role device 104. Role manager 116 may ascertain the capabilities and/or operational state of first dual-role device 102, for example, via interaction with other components or subsystems within first dual-role device 102. Role manager 116 may ascertain the capabilities and/or operational state of second dual-role device 104, for example, via interaction with second dual-role device 104 over connection 106 or some other connection therewith.

Role manager 116 is further operable to intelligently and deterministically determine which one of the first role and the second role should be assigned to first dual-role device 102 and which other one of the first role and the second role should be assigned to second dual-role device 104 based on the obtained capability and/or operational state information. Such determination may also be based on other inputs, as will be discussed in detail herein. Role manager 116 is also operable to interact with dual-role operation logic 114 to cause role selection logic 126 to implement the determined roles for first dual-role device 102 and second dual-role device 104. Role selection logic 126 may implement the determined role for first dual-role device 102 by selectively activating either first role operation logic 122 or second role operation logic 124. Role selection logic 126 may implement the determined role for second dual-role device 104 by interacting therewith via connection 106.

As will be discussed herein, role manager 116 may determine the roles to be assigned to first dual-role device 102 and second dual-role device 104 when connection 106 is first established therebetween or soon thereafter. Furthermore, role manager 116 may be further configured to monitor the capabilities and/or operational state of one or both of first dual-role device 102 and second dual-role device 104 over time while such devices are interconnected. If the capabilities and/or operational state of one or both devices changes, then role manager 116 may determine that the initial role assignment should be reversed or swapped. If role manager 116 makes such a determination, then it will interact with dual-role operation logic 114 to cause role section logic 126 to implement the role assignment swap. Role manager 116 may determine that such a role assignment swap should be implemented based on other factors as well, as will be discussed in detail herein.

In an alternate embodiment, second dual-role device 104 also includes a role manager 136. Role manager 136 may be configured in a like manner to role manager 116 to intelligently and deterministically determine which roles should be assigned to first dual-role device 102 and second dual-role device 104 and to dynamically determine when a role swap should occur. To avoid conflicts, role manager 116 and/or role manager 136 may be configured such that only one of the role managers is permitted to actually alter the role assignments for the device pairing. The determination of which device is permitted to alter the role assignments may be made based on a variety of factors, and may involve inter-device communication (e.g., via connection 106).

Figure 2:
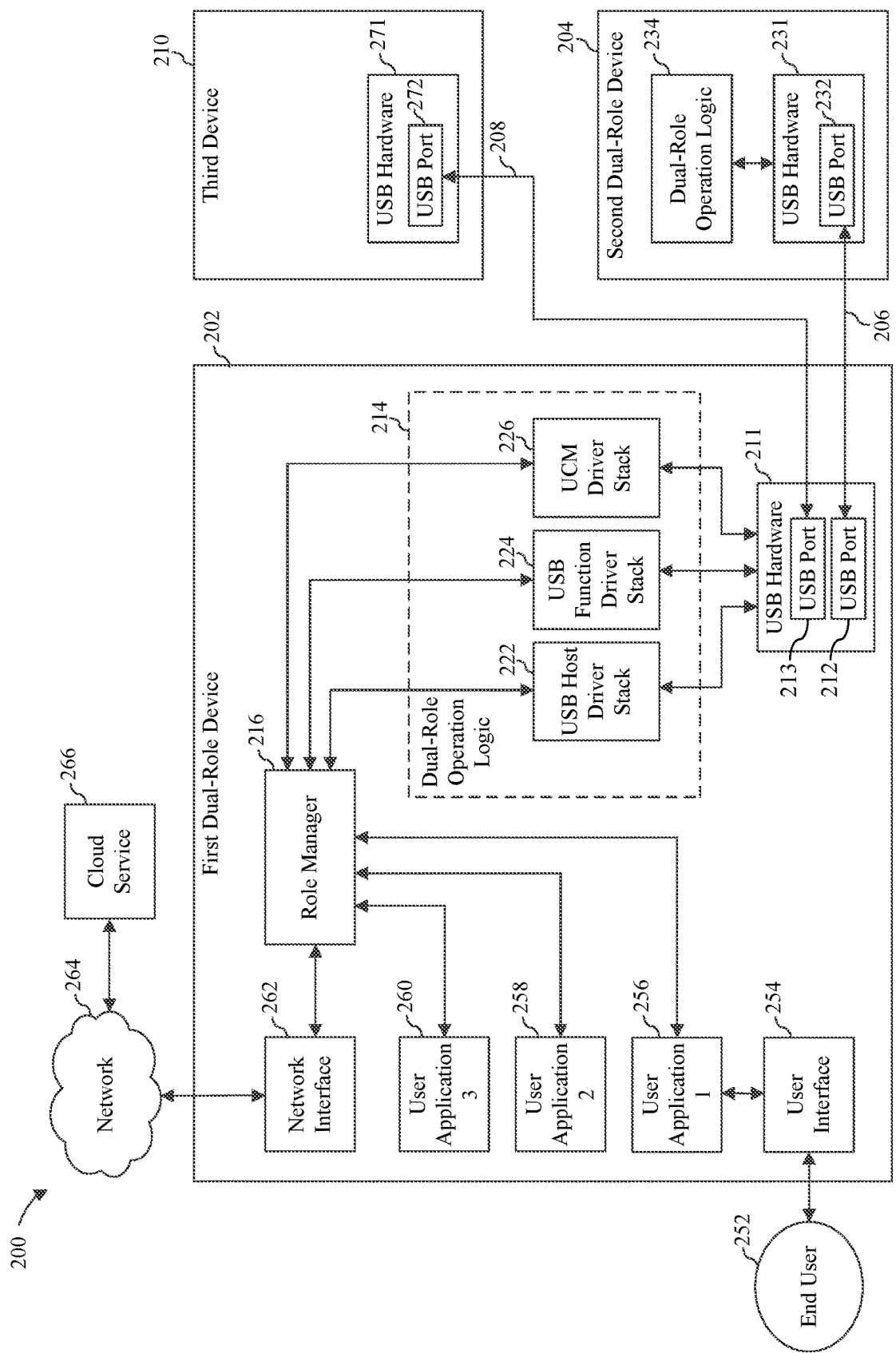
FIG. 2 is a block diagram of a system in which roles are dynamically assigned to two interconnected dual-role devices in an intelligent and deterministic manner based on the available context on one or both devices in accordance with a further embodiment.

FIG. 2 is a block diagram of a system 200 in accordance with a further embodiment in which roles are dynamically assigned between two connected dual-role devices in an intelligent and deterministic manner based on the available context on one or both devices. System 200 may be thought of as an example implementation of system 100 in which the connection between the two dual-role devices comprises a Universal Serial Bus (USB) connection (i.e., a USB cable) and in which the first and second roles comprise USB host and USB function (e.g., as defined in the USB 3.1 Specification). It is to be understood, however, that the techniques described herein with respect to system 200 can be extended to systems in which other types of connections are formed between dual-role devices and in which other types of roles are assigned.

System 200 includes a first dual-role device 202, a second dual-role device 204, and a USB cable 206 that forms a connection therebetween. First dual-role device 202 is just one example of first dual-role device 102 of FIG. 1 and second dual-role device 204 is just one example of second dual-role device 104 of FIG. 1. In one embodiment, USB cable 206 comprises a USB Type C cable. As will be appreciated by persons skilled in the art, a USB Type C cable is symmetric in the sense that the connectors located at either end thereof are structurally identical. However, USB cable 206 may comprise other types of USB cables.

As shown in FIG. 2, first dual-role device 202 comprises USB hardware 211 and dual-role operation logic 214. USB hardware 211 comprises a plurality of USB ports, including a USB port 212 and a USB port 213. Each of USB port 212 and USB port 213 is connected to a USB port controller (not shown in FIG. 2) that forms part of USB hardware 211. USB port 212 and USB port 213 may be connected to the same USB port controller or to different USB port controllers. Moreover, each of USB port 212 and USB port 213 may be connected to its respective USB port controller via one or more USB hubs (also not shown in FIG. 2), wherein such USB hub(s) also form part of USB hardware 211. A connector at a first end of USB cable 206 is plugged into USB port 212.

Dual-role operation logic 214 is logic that enables first dual-role device 202 to operate in either a USB host role or a USB function role with respect to its interaction with second dual-role device 204 via USB cable 206. In particular, dual-role operation logic 214 includes a USB host driver stack 222 that, when activated, enables first dual-role device 202 to operate in the USB host role with respect to its interaction with second dual-role device 204 via USB cable 206 and a USB function driver stack 122 that, when activated, enables first dual-role device 202 to operate in the USB function role with respect to its interaction with second dual-role device 204 via USB cable 206.

Dual-role operation logic 214 further comprises a USB connector manager (UCM) driver stack 226 that selectively activates either USB host driver stack 222 or USB function driver stack 224, thereby enabling first dual-role device 202 to operate in either the USB host role or the USB function role with respect to its interaction with second dual-role device 204 via USB cable 206.

As further shown in FIG. 2, second dual-role device 204 comprises USB hardware 231 and dual-role operation logic 234. USB hardware 231 comprises one or more USB ports, including a USB port 232. USB port 232 is connected to a USB port controller (not shown in FIG. 2) that forms part of USB hardware 231. USB port 232 may be connected to the USB port controller via one or more USB hubs (also not shown in FIG. 2), wherein such USB hub(s) also form part of USB hardware 231. A connector at a second end of USB cable 206 is plugged into USB port 232.

Dual-role operation logic 234 is logic that enables second dual-role device 204 to operate in either the USB host role or the USB function role with respect to its interaction with first dual-role device 202 via USB cable 206. Although not shown in FIG. 2, dual-role operation logic 234 may include components similar to USB host driver stack 222, USB function driver stack 224 and UCM driver stack 226 as described above in reference to dual-role operation logic 214 and such components may operate in a like manner to enable second dual-role device 204 to selectively operate in either the USB host role or the USB function role with respect to its interaction with first dual-role device 202 via USB cable 206.

As still further shown in FIG. 2, first dual-role device 202 further includes a role manager 216. Role manager 216 comprises logic that is operable to obtain capability and/or operational state information associated with one or both of first dual-role device 202 and second dual-role device 204. Role manager 216 may ascertain the capabilities and/or operational state of first dual-role device 202, for example, via interaction with other components or subsystems within first dual-role device 202. Role manager 216 may ascertain the capabilities and/or operational state of second dual-role device 204, for example, via interaction with that device over USB cable 206 or some other connection therewith.

Role manager 216 is further operable to intelligently and deterministically determine which one of the USB host role and the USB function role should be assigned to first dual-role device 202 and which other one of the USB host role and the USB function role should be assigned to second dual-role device 204 based on the obtained capability and/or operational state information. Such determination may also be based on other inputs, as will be discussed in detail herein. Role manager 216 is also operable to interact with dual-role operation logic 214 to cause UCM driver stack 226 to implement the determined roles for first dual-role device 202 and second dual-role device 204. UCM driver stack 226 may implement the determined role for first dual-role device 202 by selectively activating either USB host driver stack 222 or USB function driver stack 224. UCM driver stack 226 may implement the determined role for second dual-role device 204 by interacting therewith via USB cable 206.

Role manager 216 may determine the roles to be assigned to first dual-role device 202 and second dual-role device 204 when the two devices are first connected via USB cable 206 or soon thereafter. Furthermore, role manager 216 may be further configured to monitor the capabilities and/or operational state of one or both of first dual-role device 202 and second dual-role device 204 over time while the devices are interconnected. If the capabilities and/or operational state of one or both devices changes, then role manager 216 may determine that the initial role assignment should be reversed or swapped. If role manager 216 makes such a determination, then it will interact with dual-role operation logic 214 to cause UCM driver stack 226 to implement the role assignment swap. Role manager 216 may determine that such a role assignment swap should be implemented based on other factors as well, as will be discussed in detail herein.

In an alternate embodiment, second dual-role device 204 also includes a role manager (not shown in FIG. 2) that may be configured in a like manner to role manager 216 to intelligently and deterministically determine which roles should be assigned to first dual-role device 202 and second dual-role device 204 and to dynamically determine when a role swap should occur. To avoid conflicts, role manager 216 and/or the role manager of second dual-role device 204 may be configured such that only one of the role managers is permitted to actually alter the role assignments for the device pairing. The determination of which device is permitted to alter the role assignments may be made based on a variety of factors, and may involve inter-device communication (e.g., via connection 206).

A manner in which the USB host role and the USB function role may be assigned to a respective one of first dual-role device 202 and second dual-role device 204 will now be described with respect to flowchart 300 of FIG. 3. The steps of flowchart 300 may be performed, for example, when USB cable 206 is first used to connect first dual-role device 202 to second dual-role device 204 or soon thereafter. Although the method of flowchart 300 will be described with continued reference to certain components of system 200, persons skilled in the relevant art(s) will appreciate that the method may be implemented by other components and/or systems.

Figure 3:
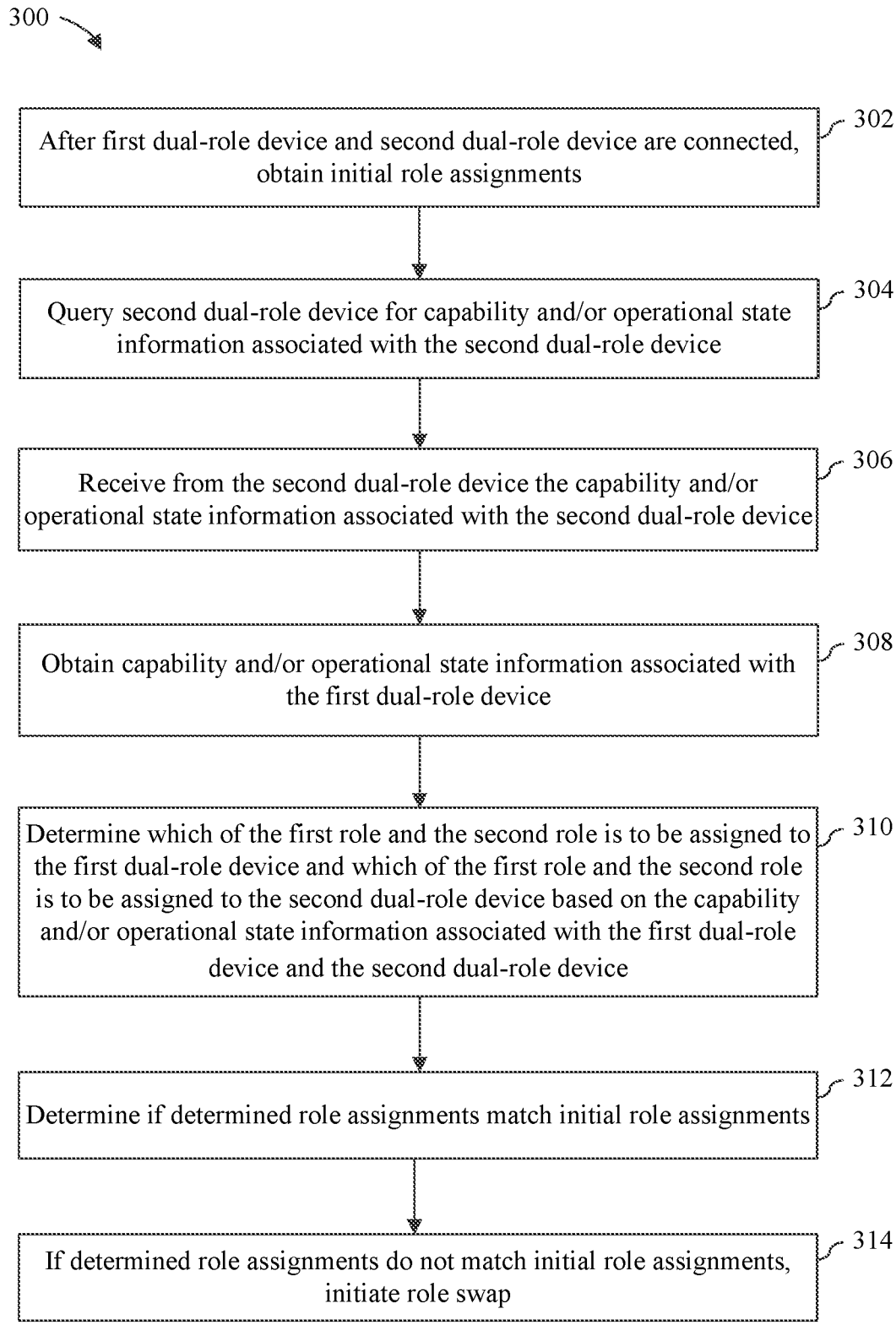
FIG. 3 depicts a flowchart of a method by which roles may be assigned to two interconnected dual-role devices in an intelligent and deterministic manner based on the available context on one or both devices in accordance with an embodiment.

As shown in FIG. 3, the method of flowchart 300 begins at step 302. At step 302, after USB cable 206 has been connected to USB port 212 of first dual-role device 202 and to USB port 232 of second dual-role device 204, USB hardware 211 (e.g., a port controller) of first dual-role device 202 and USB hardware 231 (e.g., a port controller) of second dual-role device 204 interact to obtain an initial role assignment for each device. Obtaining the initial role assignment may involve, for example, randomly assigning the role of USB host to one of first dual-role device 202 and second dual-role device 204 and assigning the role of USB function to the other one of first dual-role device 202 and second dual-role device 204. In certain embodiments, this initial role assignment takes place exclusively "at the hardware layer" in the sense that the role assignment is carried out by USB hardware 211, 231 and does not involve any participation by "higher-level" components such as role manager 216. However, in other embodiments (e.g., in different USB implementations or in embodiments that implement different connectivity protocols), this initial role assignment may involve components other than or in addition to USB hardware 211, 231. In any case, an initial role assignment is obtained during this step.

At step 304, role manager 216 queries second dual-role device 204 for capability and/or operational state information associated therewith. The query may be transmitted to second dual-role device 204 via USB cable 206. The query may be transmitted using USB host driver stack 222 in the case where first dual-role device 202 has initially been assigned the USB host role or via USB function driver stack 224 in the case where first dual-role device 202 has initially been assigned the USB function role.

At step 306, role manager 216 receives from second dual-role device 204 the capability and/or operational state information associated therewith. The information may be transmitted from second dual-role device 204 to first dual-role device 202 via USB cable 206. The information may be received using USB host driver stack 222 in the case where first dual-role device 202 has initially been assigned the USB host role or via USB function driver stack 224 in the case where first dual-role device 202 has initially been assigned the USB function role.

The communication carried out in steps 304 and 306 may utilize proprietary descriptors and/or commands that are conveyed via vendor-specific fields defined by the USB protocol.

At step 308, role manager 216 obtains capability and/or operational state information associated with first dual-role device 202. Role manager 216 may obtain the capability and/or operational state information associated with first dual-role device 202, for example, via interaction with other components or subsystems within first dual-role device 102.

In an optional step that is not shown in FIG. 3, role manager 216 may also operate to send the capability and/or operational state information associated with first dual-role device 202 to second dual-role device 204. The information may be transmitted from first dual-role device 202 to second dual-role device 204 via USB cable 206. This communication may also be carried out by utilizing proprietary descriptors and/or commands that are conveyed via vendor-specific fields defined by the USB protocol.

At step 310, role manager 216 determines which of the USB host role (referred to in FIG. 3 as "the first role") and the USB function role (referred to in FIG. 3 as "the second role") is to be assigned to first dual-role device 202 and which of the USB host role and the USB function role is to be assigned to second dual-role device 204 based on the capability and/or operational state information associated with first dual-role device 202 and second dual-role device 204.

At step 312, role manager 216 determines if the determined role assignments from step 310 match the initial role assignments from step 302. If role manager 216 determines that the determined role assignments match the initial role assignments, then no role swap is currently necessary and the devices can continue to operate and interact with each other via USB cable 206 in their currently-assigned roles.

However, as shown at step 314, if role manager 216 determines that the determined role assignments from step 310 do not match the initial role assignments from step 302, then role manager 216 initiates a role swap. Initiating a role swap may involve interacting with UCM driver stack 226 to cause USB hardware 211, 231 to switch the roles associated with USB port 212 and USB port 232. This will cause the role that was initially assigned to first dual-role device 202 to be assigned instead to second dual-role device 204 and the role that was initially assigned to second dual-role device 204 to instead be assigned to first dual-role device 202.

In an embodiment in which USB hardware 211, 231 can only be instructed in step 314 to randomly reassign the roles such that an incorrect role assignment may once again occur, steps 304, 306, 308, 310 and 312 can be repeated until such time as the randomly assigned roles are consistent with the desired role assignment.

In one embodiment, role manager 216 is configured to assign the appropriate data role (i.e., USB host or USB function) to each of first dual-role device 202 and second dual-role device 204 based on which device has the more appropriate higher level drivers that can provide USB host functionality and which device has the more appropriate higher level drivers that can provide USB function functionality.

In one particular embodiment, the determination of which higher level drivers are present on each dual-role device can be deduced from an identifier (e.g., a SKU) of the operating system that the dual-role device is using and also whether an operating system debugger is enabled. Such information may be obtained by role manager 216 in a manner described above with respect to steps 304, 306 and 308 of flowchart 300. For example, if first dual-role device 202 and second dual-role device 204 are running operating systems with "Desktop SKU" and "Mobile SKU" identifiers, respectively, then the device with the "Desktop SKU" identifier is assigned the role of USB host. In another example, if first dual-role device 202 and second dual-role device 204 are running operating systems with "Desktop SKU" identifiers and the debugger is enabled on one of them, the device with the debugger enabled is assigned the role of USB function. As will be discussed herein, a wide variety of other criteria may be used to intelligently and deterministically assign the appropriate data role to each device.

Role manager 216 may be further configured to utilize capability and/or operational state information associated with first dual-role device 202 and second dual-role device 204 to assign a power provider role to one of first dual-role device 202 and second dual-role device 204 and to assign a power consumer role to the other one of first dual-role device 202 and second dual-role device 204. The power provider and power consumer roles may be those defined, for example, by the USB Power Delivery 2.0 Specifications. In an embodiment, role manager 216 may operate to assign these power roles after the data roles (USB host vs. USB function) have been resolved via the execution of a method such as that described above in reference to flowchart 300 of FIG. 3. Role manager 216 may override initial power provider and power consumer role assignments established by USB hardware 211, 231. In determining how to assign the power roles, role manager 216 may apply a heuristic that considers one or more factors. For example, the heuristic may be based on multiple factors which may include but are not limited to whether each device is plugged in or not, which device has the more capable battery, what the device's data role is, etc.

In one embodiment in which first dual-role device 202 and second dual-role device 204 each include a role manager having role swapping capability, the method described above in reference to flowchart 300 is performed by the role manager of whichever device is initially assigned the USB host role by USB hardware 211, 231. This prevents scenarios in which both role managers determine that a role swap should be carried out, and both initiate role swaps that effectively cancel each other out. However, such an approach can only be used if there is a role manager installed on both devices. In an embodiment in which only first dual-role device 202 includes the role swapping capability, the method of flowchart 300 can be carried out by first dual-role device 202 regardless of whether it is initially assigned the USB host role or the USB function role by USB hardware 211, 231.

In still further embodiments in which both devices have the role-swapping capability, it is not necessarily the USB host device that initiates the role swap. For example, in an embodiment in which both entities arrive at the same conclusion as to what each device's role assignment needs to be, the entities may determine between themselves which one of them should initiate the role swap irrespective of which entity is currently in the USB host role. Thus, in accordance with such further embodiments, it may be either the USB host device or the USB function device that initiates the role swap.

In making the foregoing role assignment determinations (e.g., USB host vs. USB function, power provider vs. power consumer), role manager 216 may take into account a wide variety of contextual factors beyond the examples described above.

In one embodiment, role manager 216 is configured to store the role assignments for a particular pair of devices. For example, after determining the appropriate role assignments for first dual-role device 202 and second dual-role device 204, role manager 216 may store the determined role assignments in a memory that is internal with respect to first dual-role device 202 or that is external with respect to first dual-role device 202 (e.g., on a server, external storage device, or other entity that first dual-role device 202 may connect to via a network or other communication media) and accessible thereto. The determined role assignment information may be stored, for example, in association with identifiers of the two devices or an identifier of the device pairing. Should first dual-role device 202 and second dual-role device 204 be disconnected (e.g., by unplugging USB cable 206 therefrom) and then reconnected (e.g., via USB cable 206 or some other USB cable), role manager 216 can access the stored assignment determination information for the two devices and then use that information to control or guide a new role assignment determination therefor.

Figure 4:
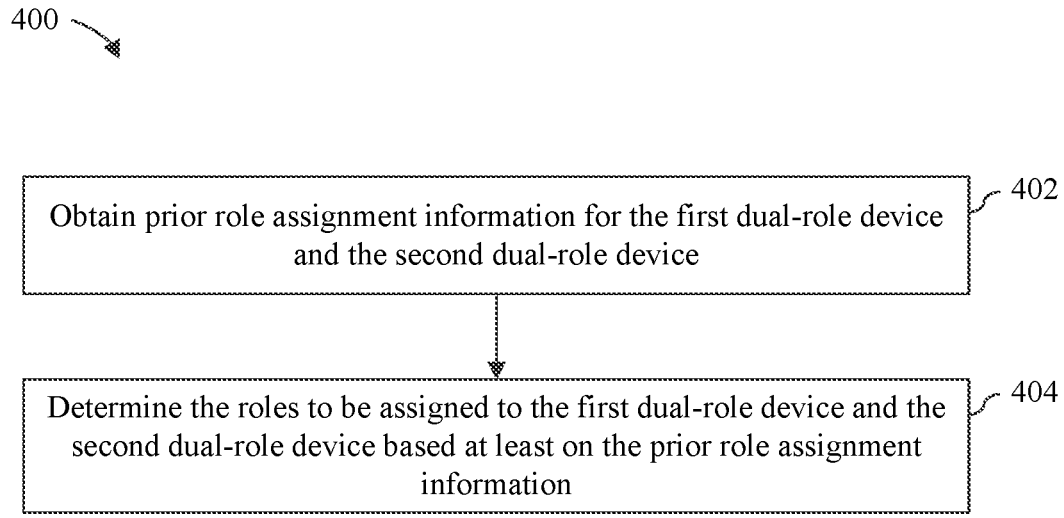
FIG. 4 depicts a flowchart of a method for assigning roles to two interconnected dual-role devices based on prior role assignment information associated therewith in accordance with an embodiment.

FIG. 4 depicts a flowchart 400 of a method performed by role manager 216 in accordance with this embodiment. As shown in FIG. 4, the method of flowchart 400 begins at step 402 in which role manager 216 obtains prior role assignment information for first dual-role device 202 and second dual-role device 204. Such prior role assignment information may be cached or stored in a memory internal to dual-role device 202 or dual-role device 204 or in an external memory that is accessible to one or both devices. At step 404, role manager 216 determines the roles to be assigned to the first dual-role device and the second dual-role device based at least on the prior role assignment information obtained during step 402.

In another embodiment, role manager 216 is configured to determine a context of first dual-role device 202 and/or second dual-role device 204. The determined context may comprise a description or representation of a device type of each of first dual-role device 202 and second dual-role device 204. The determined context may also comprise a description or representation of the current capabilities and/or operational state of first dual-role device 202 and/or second dual-role device 204. Role manager 216 may provide such context to an external entity and, in return, receive one or more historical role usage models that are deemed applicable to the particular context. Such historical role usage models may represent role assignments that were utilized in the past by pairings of similar devices having similar contexts. For example, if telemetry revealed that 90% of users have used a certain role assignment scheme for a certain pair of device types, then that information can be leveraged to predict future role assignments for similar device pairings.

Such historical role usage models may be maintained by a system, device or service that is external with respect to first dual-role device 202 but that is accessible thereto via a connection (e.g., via a network connection). For example, as shown in FIG. 2, role manager 216 may be configured to utilize a network interface 262 of first dual-role device 202 to access a cloud service 266 that resides on a network 264, wherein cloud service 266 is capable of providing one or more historical role usage models that are applicable to a context observed by role manager 216. Role manager 216 may use the historical role usage model(s) provided by cloud service 266 to determine the appropriate role assignments for first dual-role device 202 and second dual-role device 204.

Figure 5:
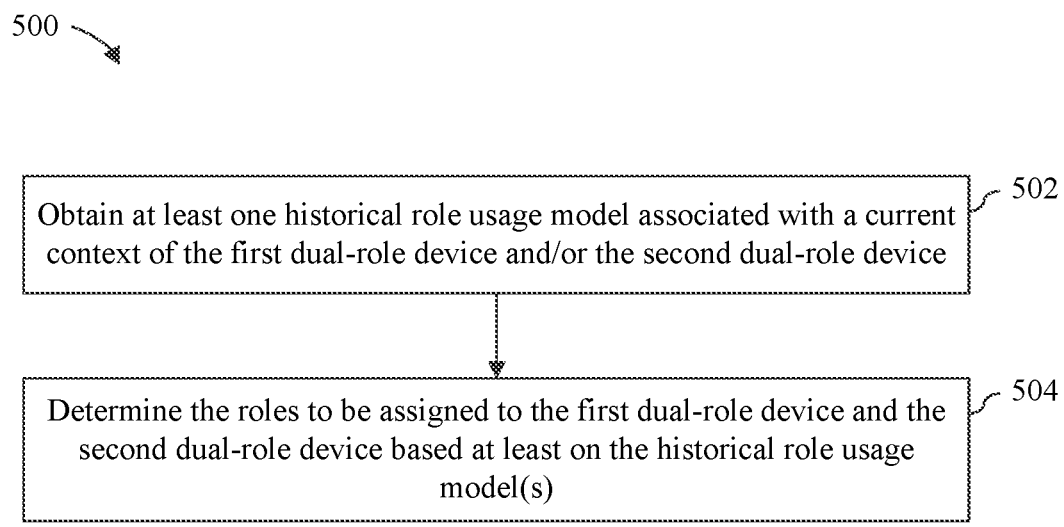
FIG. 5 depicts a flowchart of a method for assigning roles to two interconnected dual-role devices based on one or more historical role usage models in accordance with an embodiment.

FIG. 5 depicts a flowchart 500 of a method performed by role manager 216 in accordance with this embodiment. As shown in FIG. 5, the method of flowchart 500 begins at step 502 in which role manager 216 obtains at least one historical role usage model associated with a current context of first dual-role device 202 and/or second dual role device 204. The historical role usage model(s) may be obtained from a system, device, or service (e.g., cloud service 266) that is external to first dual-role device 202 but communicatively connected thereto. The historical role usage model(s) may be returned to first dual-role device 202 in response to first dual-role device 202 sending the context information to the external system, device or service. At step 504, role manager 216 determines the roles to be assigned to the first dual-role device and the second dual-role device based at least on the historical role usage model(s) obtained during step 502.

In yet another embodiment, role manager 216 is configured to use information about one or more identification mechanisms of first dual-role device 202 and/or second dual role device 204 to determine the appropriate role assignment. For example, as was discussed above, an operating system identifier may be used to determine whether a particular device has the ability to operate as a USB host or a USB function (e.g., has the high-level drivers necessary to operate as a USB host or a USB function). For example, a desktop version of an operating system may have different capabilities than a mobile version of the same operating system.

In still another embodiment, role manager 216 is configured to use information about the presence or absence of other subsystems on first dual-role device 202 and/or second dual-role device 204 to determine the appropriate role assignment. As used herein, the term "subsystem" refers to one or more software components (e.g., program instructions executed by a processing device), one or more hardware components (e.g., physical components of a device), or a combination of software and hardware components. For example, a role assignment decision may be made based on whether one or both of first dual-role device 202 and second dual-role device 204 includes a battery.

In a further embodiment, role manager 216 is configured to use information about a current status of one or more subsystems on first dual-role device 202 and/or second dual-role device 204 to determine the appropriate role assignment. For example, a role assignment decision may be based on whether one of the devices is currently plugged into a wall outlet and/or whether one of the devices is running on battery power only. As another example, a role assignment decision may be based on which device has a more capable battery.

In a still further embodiment, role manager 216 is configured to use information about one or more other devices that may be connected to first dual-role device 202 and/or second dual-role device 204 to determine the appropriate role assignment. For example, as shown in FIG. 2, a third device 210 is connected to first dual-role device 202. In particular, third device 210 includes USB hardware 271 that includes a USB port 272. A USB cable 208 connects USB port 272 to USB port 213, thereby forming a USB connection between third device 210 and first dual-role device 202. In further accordance with this example, assume that first dual-role device 202 is capable of acting in the USB function role with respect to only one other device at a time. Thus, if first dual-role device 202 has already been assigned a USB function role with respect to its interaction with third device 210 via USB cable 208, then first dual-role device 202 should not also be assigned a USB function role with respect to its interaction with any other devices. Since role manager 216 can obtain information that indicates that first dual-role device 202 has already been assigned a USB function role with respect to its interaction with third device 210 via USB cable 208, role manager 216 can use that information to prevent first dual-role device 202 from being assigned a USB function role with respect to its interaction with second dual-role device 204 via USB cable 206. Still other information about third device 210 can be leveraged in making the role assignment determination. Furthermore, information about one or more devices that are currently connected to second dual-role device 204 may also be taken into account by role manager 216 when making the role assignment determination.

In another embodiment, role manager 216 is configured to use user preference information provided by an end user of first dual-role device 202 and/or second dual-role device 204 to determine the appropriate role assignment. The end user may provide such user preference information by interacting with first dual-role device 202 or second dual-role device 204 via a user interface thereof. The user interface may comprise a software-implemented user interface (e.g., a user interface rendered to a display by executing software) or one or more hardware input mechanisms (e.g., physical switches, buttons, sliders or the like). For example, the end user may interact with such user interface to confirm a role assignment decision or to proactively specify the role to be assigned to a particular devices or set of devices.

An example of this scenario is shown in FIG. 2, in which an end user 252 interacts with a user interface 254 of first dual-role device to provide user preference information to an executing application 256, denoted "User Application 1." This user preference information is then passed to role manager 216 which can take the information into account when rendering a role assignment determination.

Figure 6:
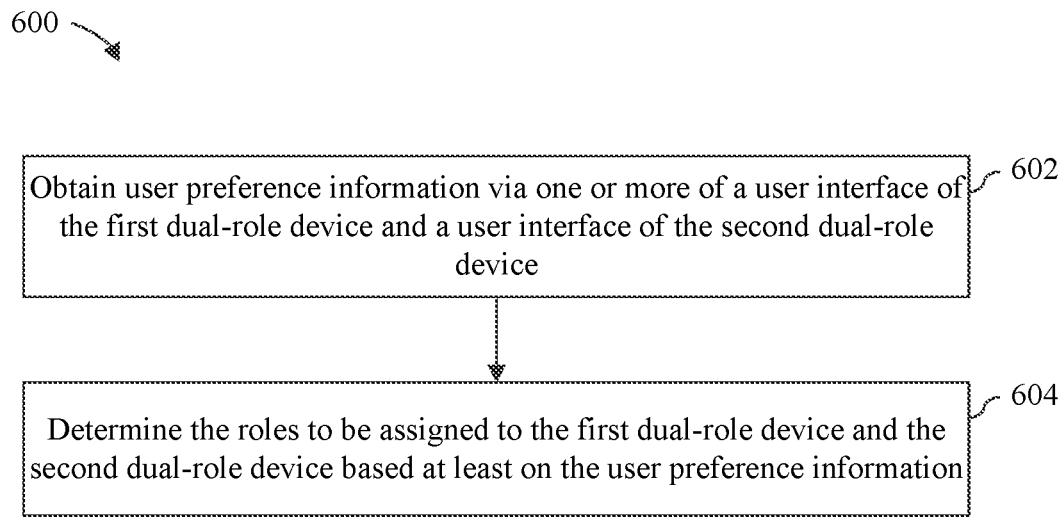
FIG. 6 depicts a flowchart of a method for assigning roles to two interconnected dual-role devices based on user preference information in accordance with an embodiment.

FIG. 6 depicts a flowchart 600 of a method performed by role manager 216 in accordance with this embodiment. As shown in FIG. 6, the method of flowchart 600 begins at step 602 in which role manager 216 obtains user preference information via one or more of a user interface of first dual-role device and a user interface of second dual-role device 204. At step 604, role manager 216 determines the roles to be assigned to first dual-role device 202 and second dual-role device 204 based at least on the user preference information obtained during step 602.

In yet another embodiment, role manager 216 is configured to use information about the configuration settings of first dual-role device 202 and/or second dual-role device 204 to determine the appropriate role assignment. For example, an end user of first dual-role device 202 and/or second dual-role device 204 may have explicitly configured one or both of those devices to operate in a particular role. Alternatively, a role assignment decision can be derived or inferred from other configuration settings. For example, if a device is configured to operate in a low-power mode, then this may drive a role assignment decision.

In still another embodiment, role manager 216 is configured to use information about role requirements of one or more applications executing on first dual-role device 202 and/or second dual-role device 204 to determine the appropriate role assignment. For example, as shown in FIG. 2, one or more of an executing application 258 (denoted "User Application 2") and an executing application 260 (denoted "User Application 3") may operate to provide role manager 216 with role requirement information. Such role requirement information may indicate, for example, a role that each application needs first dual-role device 202 to be assigned in order for the application to perform certain operations. Role manager 216 may take into account such role requirement information when assigning roles to first dual-role device 202 and second dual-role device 204.

Figure 7:
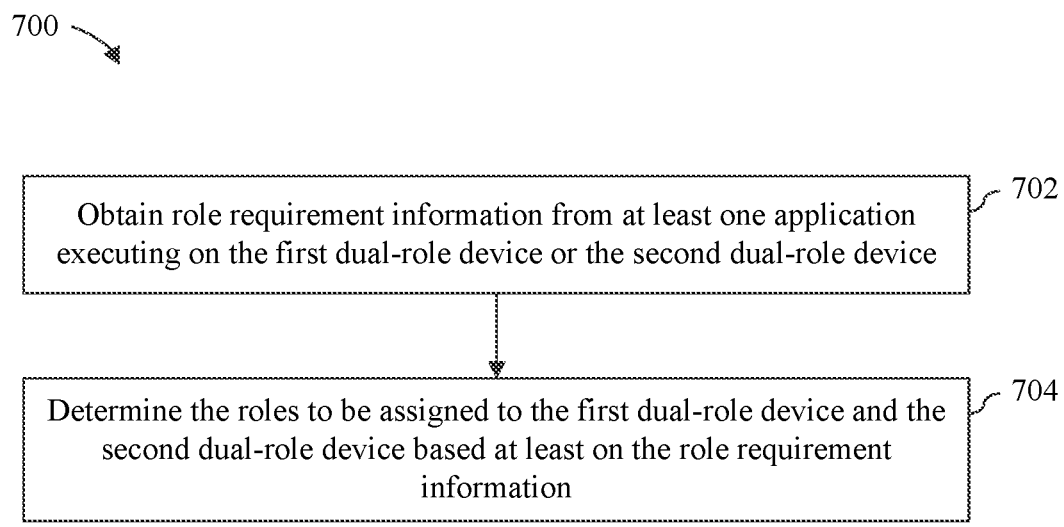
FIG. 7 depicts a flowchart of a method for assigning roles to two interconnected dual-role devices based on role requirement information obtained from one or more applications in accordance with an embodiment.

FIG. 7 depicts a flowchart 700 of a method performed by role manager 216 in accordance with this embodiment. As shown in FIG. 7, the method of flowchart 700 begins at step 702 in which role manager 216 obtains role requirement information from at least one application executing on first dual-role device 202 or second dual-role device 204. At step 704, role manager 216 determines the roles to be assigned to the first dual-role device and the second dual-role device based at least on the role requirement information obtained during step 602.

In yet another embodiment, role manager 216 is configured to dynamically swap the roles assigned to each of first dual-role device 202 and second dual-role device 204 in response to state changes at one or both devices. In particular, after roles have been assigned to first dual-role device 202 and second dual-role device 204 (e.g., in accordance with the method described above in reference to flowchart 300), role manager 216 may monitor the capabilities and/or operational state of one or both of first dual-role device 202 and second dual-role device 204 over time while the devices are interconnected. If the capabilities and/or operational state of one or both devices changes, then role manager 216 may determine that the current role assignment should be reversed or swapped. If role manager 216 makes such a determination, then it may interact with dual-role operation logic 214 to cause UCM driver stack 226 to implement the role assignment swap. In an alternate embodiment, role manager 216 may initiate the role swap by forcing a reconnection between first dual-role device 202 and second dual-role device 204, which will cause the method of flowchart 300 to be performed again in light of the changed context. Still other methods for dynamically re-assigning roles based on state changes at one or both of first dual-role device 202 and second dual-role device 204 may be used.

Figure 8:
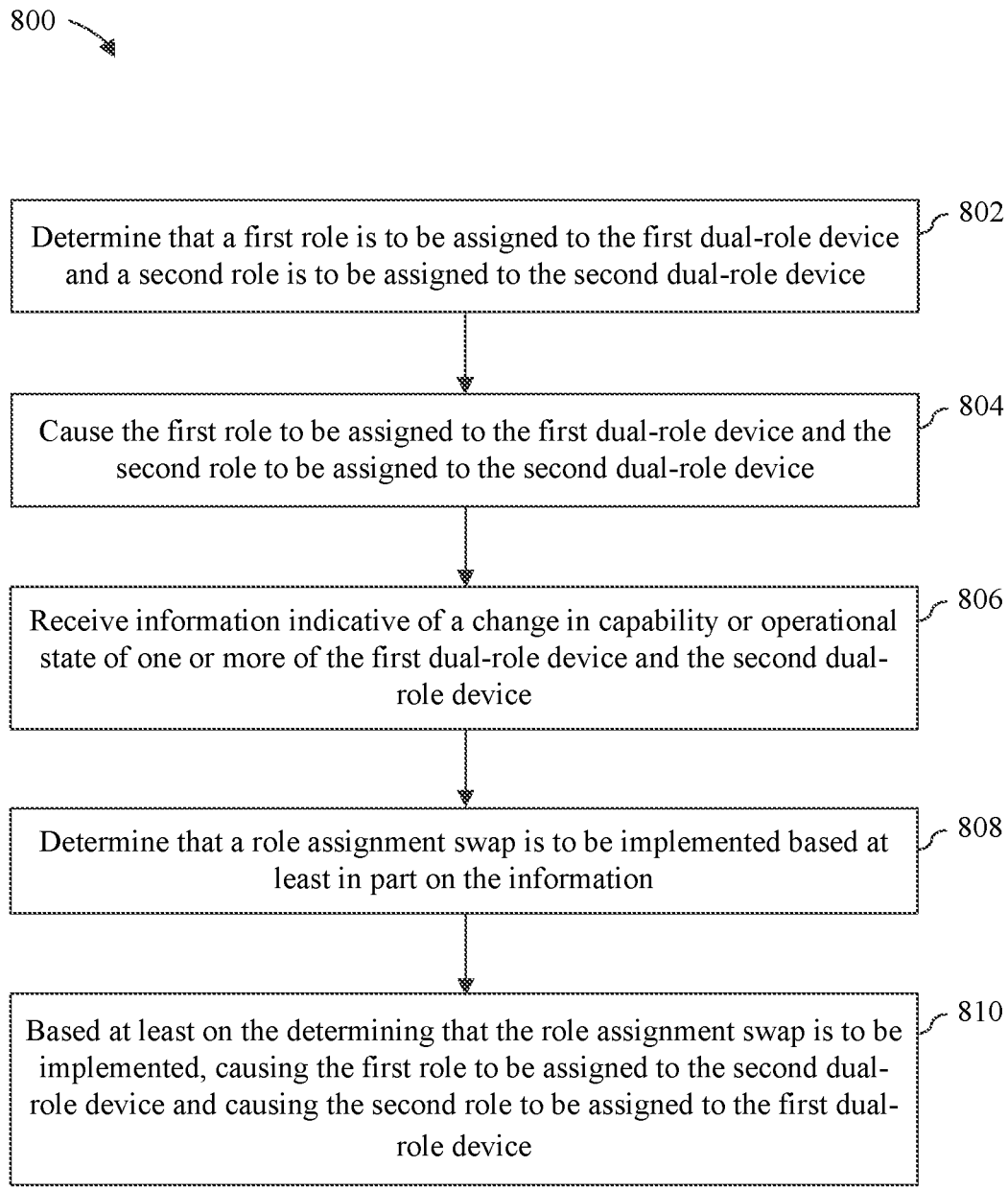
FIG. 8 depicts a flowchart of a method for dynamically changing roles assigned to each of two interconnected dual-role devices in response to state changes at one or both devices in accordance with an embodiment.

FIG. 8 depicts a flowchart 800 of a method performed by role manager 216 in accordance with this embodiment. As shown in FIG. 8, the method of flowchart 800 begins at step 802 in which role manager 216 determines that a first role is to be assigned to first dual-role device 202 and that a second role is to be assigned to second dual-role device 204. At step 804, role manager 216 causes the first role to be assigned to first dual-role device 202 and the second role to be assigned to second dual-role device 204. Steps 802 and 804 may be carried out in a like manner to steps 310, 312 and 314 of flowchart 300 as described above. Steps 802 and 804 may be performed, for example, when a USB connection is first formed between first dual-role device 202 and second dual-role device 204 or shortly thereafter.

At step 806, role manager 216 receives information indicative of a change in capability or operational state of one or more of first dual-role device 202 and second dual-role device 204. The change may comprise a change to any of the previously-described factors that may be used by role manager 216 in making a role assignment determination, although this example is not intended to be limiting. For example, the change may comprise: the adding, removing, activation or deactivation of a subsystem of first dual-role device 202 and/or second dual-role device 204, a change of state of a subsystem of first dual-role device 202 and/or second dual-role device 204, a change of user preference input with respect to role assignment for first dual-role device 202 and second dual-role device 204, a change in configuration information of first dual-role device 202 and/or second dual-role device 204, the connection or disconnection of another device to first dual-role device 202 and/or second dual-role device 204, and a change of role requirements by applications executing on first dual-role device 202 and/or second dual role device 204. Still other changes may include: a change of power source by first dual-role device 202 and/or second dual-role device 204, a change of state of a power source currently being used to supply power to first dual-role device 202 or second dual-role device 204, and a change in a level of consumption of a resource (e.g., power, CPU cycles, memory, I/O, network bandwidth, or the like) by first dual-role device 202 and/or second dual-role device 204.

At step 808, role manager 216 determines that a role assignment swap is to be implemented based at least in part on the information received during step 806. At step 810, based at least on the determining that the role assignment swap is to be implemented, role manager 216 causes the first role to be assigned to second dual-role device 204 and causes the second role to be assigned to first dual-role device 202. As noted above, this may entail interacting with dual-role operation logic 214 to cause UCM driver stack 226 to implement the role assignment swap, or may entail forcing a reconnection between first dual-role device 202 and second dual-role device 204, which will cause the method of flowchart 300 to be performed again in light of the changed context. Still other methods may be used.

It is noted that in certain embodiments and/or in certain operating modes, role manager 216 may be capable of making a role assignment or role swapping decision by observing the capabilities and/or operational state of only first dual-role device 202 or by observing the capabilities and/or operational state of only second dual-role device 204. However, as will be understood by persons skilled in the relevant art(s), it can be helpful to have capability and operational state information from both devices to make a suitable role assignment decision. For example, if one device is assigned the USB function role but then determines that it cannot support that role, it may try to initiate a role swap. However, if the device is also capable of determining that the other device also could not support the USB function role, then it can avoid trying to initiate a fruitless role swap and instead take some other action, such as outputting an error message.

The foregoing description of system 200 and the methods that may be performed thereby provide some implementation-specific examples of a mechanism that dynamically assigns roles between two interconnected dual-role devices in an intelligent and deterministic manner based on the available context on each device. However, the described techniques can be extended to any system that allows for the interconnection of dual-role devices, including the more generalized system 100 of FIG. 1. For example, the techniques described herein can be used to dynamically, intelligently and deterministically assign roles to interconnected dual-role devices in systems in which such devices can act as a host or function, power provider or power consumer, master or slave, client or server, source or sink, upstream or downstream, to name just a few.

III. Example Mobile Device Implementation

Figure 9:
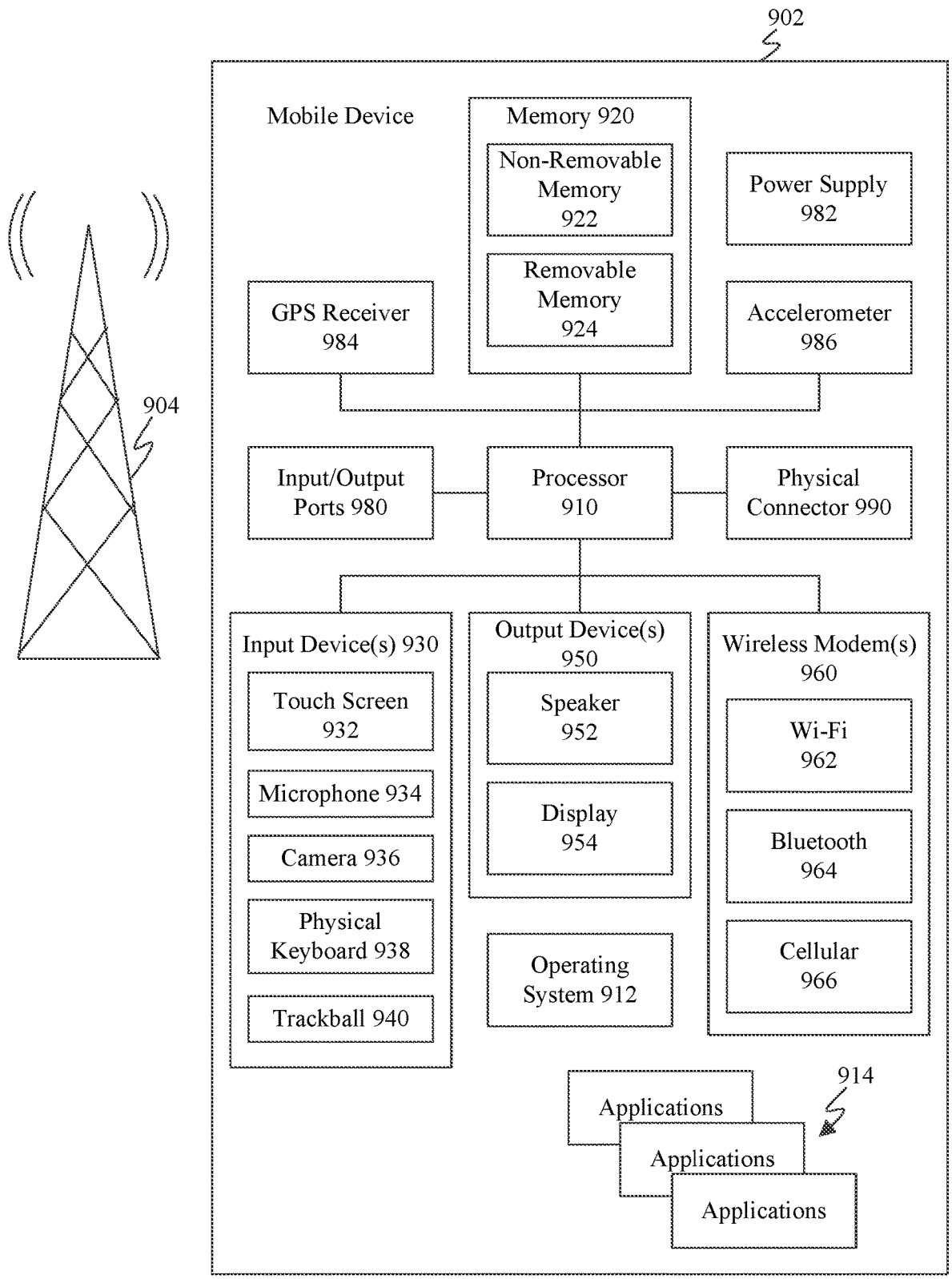
FIG. 9 is a block diagram of an example mobile device that may be used to implement various embodiments.

FIG. 9 is a block diagram of an exemplary mobile device 902 that may implement embodiments described herein. For example, mobile device 902 may be used to implement first dual-role device 102, second dual-role device 104, first dual-role device 202, second dual-role device 204 or third device 210. As shown in FIG. 9, mobile device 902 includes a variety of optional hardware and software components.

Any component in mobile device 902 can communicate with any other component, although not all connections are shown for ease of illustration. Mobile device 902 can be any of a variety of computing devices (e.g., cell phone, smartphone, handheld computer, Personal Digital Assistant (PDA), etc.) and can allow wireless two-way communications with one or more mobile communications networks 904, such as a cellular or satellite network, or with a local area or wide area network.

The illustrated mobile device 902 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components of mobile device 902 and provide support for one or more application programs 914 (also referred to as "applications" or "apps"). Application programs 914 may include common mobile computing applications (e.g., e-mail applications, calendars, contact managers, web browsers, messaging applications) and any other computing applications (e.g., word processing applications, mapping applications, media player applications).

The illustrated mobile device 902 can include memory 920. Memory 920 can include non-removable memory 922 and/or removable memory 924. Non-removable memory 922 can include RAM, ROM, flash memory, a hard disk, or other well-known memory devices or technologies. Removable memory 924 can include flash memory or a Subscriber Identity Module (SIM) card, which is well known in GSM communication systems, or other well-known memory devices or technologies, such as "smart cards." Memory 920 can be used for storing data and/or code for running operating system 912 and applications 914. Example data can include web pages, text, images, sound files, video data, or other data to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 902 can support one or more input devices 930, such as a touch screen 932, a microphone 934, a camera 936, a physical keyboard 938 and/or a trackball 940 and one or more output devices 950, such as a speaker 952 and a display 954. Other possible output devices (not shown) can include piezoelectric or other haptic output devices. Some devices can serve more than one input/output function. For example, touch screen 932 and display 954 can be combined in a single input/output device. The input devices 930 can include a Natural User Interface (NUI).

Wireless modem(s) 960 can be coupled to antenna(s) (not shown) and can support two-way communications between the processor 910 and external devices, as is well understood in the art. The modem(s) 960 are shown generically and can include a cellular modem 966 for communicating with the mobile communication network 904 and/or other radio-based modems (e.g., Bluetooth 964 and/or Wi-Fi 962). At least one of the wireless modem(s) 960 is typically configured for communication with one or more cellular networks, such as a GSM network for data and voice communications within a single cellular network, between cellular networks, or between the mobile device and a public switched telephone network (PSTN).

Mobile device 902 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components of mobile device 902 are not required or all-inclusive, as any components can be deleted and other components can be added as would be recognized by one skilled in the art.

In an embodiment, mobile device 902 is configured to perform any of the functions of either of first dual-role device 102, second dual-role device 104, first dual-role device 202, second dual-role device 204, or third device 210. Computer program logic for performing the functions of these devices may be stored in memory 920 and executed by processor 910. By executing such computer program logic, processor 910 may be caused to implement any of the features of any of these devices. Also, by executing such computer program logic, processor 910 may be caused to perform any or all of the steps of the flowcharts of FIGS. 3-8.

IV. Example Computer System Implementation

Figure 10:
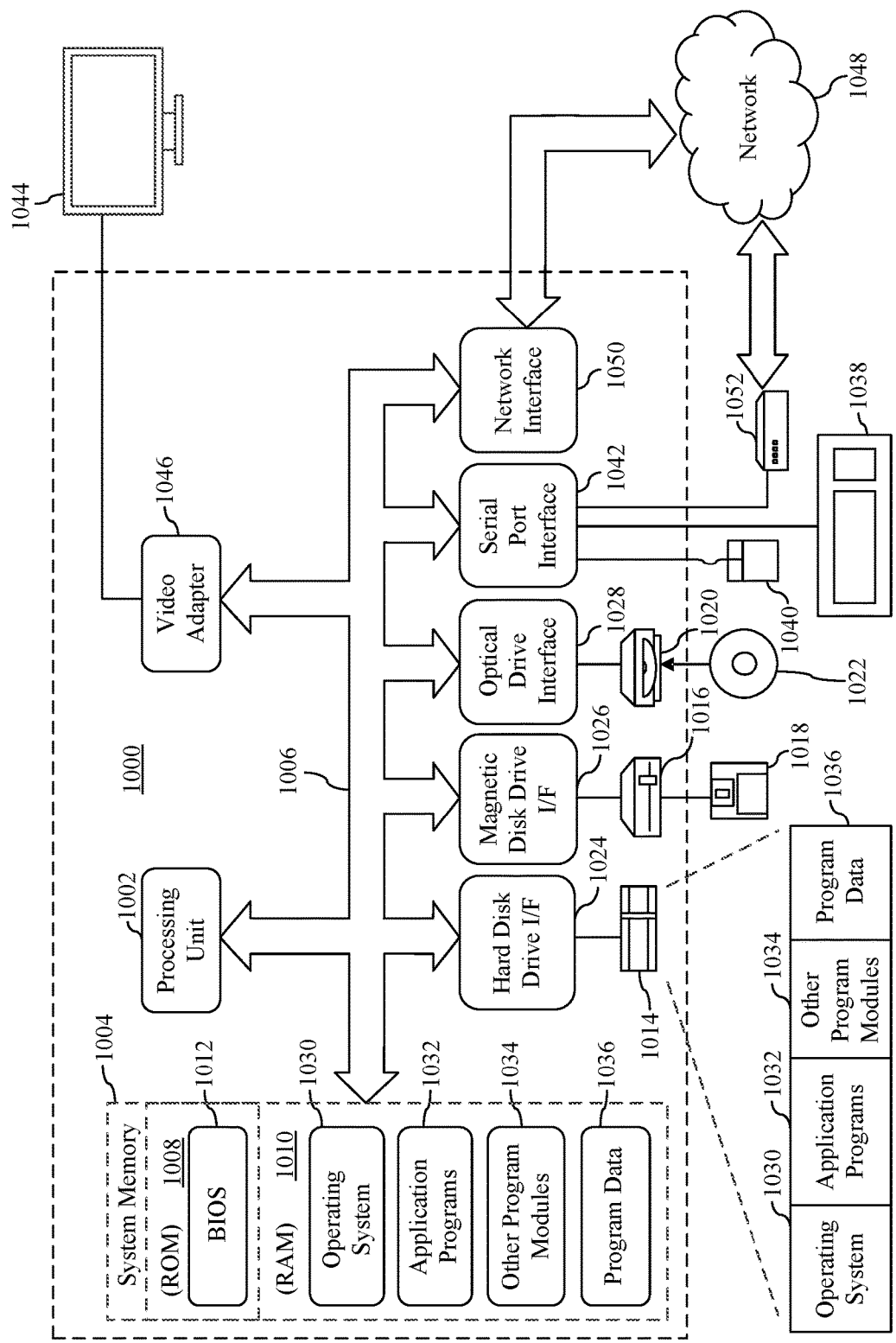
FIG. 10 is a block diagram of an example processor-based computer system that may be used to implement various embodiments.

FIG. 10 depicts an example processor-based computer system 1000 that may be used to implement various embodiments described herein. For example, system 1000 may be used to implement first dual-role device 102, second dual-role device 104, first dual-role device 202, second dual-role device 204, or third device 210. System 1000 may also be used to implement any or all of the steps of the flowcharts of FIGS. 3-8. The description of system 1000 provided herein is provided for purposes of illustration, and is not intended to be limiting. Embodiments may be implemented in further types of computer systems, as would be known to persons skilled in the relevant art(s).

As shown in FIG. 10, system 1000 includes a processing unit 1002, a system memory 1004, and a bus 1006 that couples various system components including system memory 1004 to processing unit 1002. Processing unit 1002 may comprise one or more microprocessors or microprocessor cores. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

System 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, BLU-RAY™ disk or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1030, one or more application programs 1032, other program modules 1034, and program data 1036. In accordance with various embodiments, the program modules may include computer program logic that is executable by processing unit 1002 to perform any or all of the functions and features of first dual-role device 102, second dual-role device 104, first dual-role device 202, second dual-role device 204, and third device 210. The program modules may also include computer program logic that, when executed by processing unit 1002, performs any of the steps or operations shown or described in reference to the flowcharts of FIGS. 3-8.

A user may enter commands and information into system 1000 through input devices such as a keyboard 1038 and a pointing device 1040 (e.g., a mouse). Other input devices (not shown) may include a microphone, joystick, game controller, scanner, or the like. In one embodiment, a touch screen is provided in conjunction with a display 1044 to allow a user to provide user input via the application of a touch (as by a finger or stylus for example) to one or more points on the touch screen. These and other input devices are often connected to processing unit 1002 through a serial port interface 1042 that is coupled to bus 1006, but may be connected by other interfaces, such as a parallel port, game port, or a universal serial bus (USB). Such interfaces may be wired or wireless interfaces.

Display 1044 is connected to bus 1006 via an interface, such as a video adapter 1046. In addition to display 1044, system 1000 may include other peripheral output devices (not shown) such as speakers and printers.

System 1000 is connected to a network 1048 (e.g., a local area network or wide area network such as the Internet) through a network interface 1050, a modem 1052, or other suitable means for establishing communications over the network. Modem 1052, which may be internal or external, is connected to bus 1006 via serial port interface 1042.

As used herein, the terms "computer program medium," "computer-readable medium," and "computer-readable storage medium" are used to generally refer to memory devices or storage structures such as the hard disk associated with hard disk drive 1014, removable magnetic disk 1018, removable optical disk 1022, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050, serial port interface 1042, or any other interface type. Such computer programs, when executed or loaded by an application, enable system

1000 to implement features of embodiments discussed herein. Accordingly, such computer programs represent controllers of the system 1000.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1000 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Further Example Embodiments

A method is described herein. The method is performed by a software-implemented role manager executing on a first device that is communicatively connected to a second device. The method includes: determining that a first role is to be assigned to the first device and a second role is to be assigned to the second device; causing the first role to be assigned to the first device and the second role to be assigned to the second device; receiving information indicative of a change of capability or operational state of one or more of the first device and the second device; determining that a role assignment swap is to be implemented based at least in part on the information; and based at least on the determining that the role assignment swap is to be implemented, causing the first role to be assigned to the second device and causing the second role to be assigned to the first device.

In one embodiment of the foregoing method, the first role and the second role respectively comprise: a host and a function; a power supplier and a power consumer; a master and a slave; a server and a client; a source and a sink; or an upstream or a downstream.

In another embodiment of the foregoing method, receiving information indicative of the change of capability or operational state of one or more of the first device and the second device comprises receiving information indicative of one or more of: an addition, removal, activation or deactivation of a subsystem of the first device or the second device; a change of a state of a subsystem of the first device or the second device; a change of user preference input with respect to role assignment for the first device and second device; a change in configuration information of the first device or the second device; a connection or disconnection of at least a third device to or from the first device or the second device; a change of role requirements by at least one application executing on the first device or the second device; a change of power source by the first device or the second device; a change of a state of a power source currently being used to supply power to the first device or the second device; and a change in a level of consumption of a resource by the first device or the second device.

In yet another embodiment of the foregoing method, determining that the first role is to be assigned to the first device and the second role is to be assigned to the second device comprises: querying the second device for capability and operational state information associated with the second device; receiving from the second device the capability and operational state information associated with the second device; obtaining capability and operational state information associated with the first device; and determining that the first role is to be assigned to the first device and the second role is to be assigned to the second device based on the capability and operational state information associated with the first device and the second device.

In still another embodiment of the foregoing method, determining that the first role is to be assigned to the first device and the second role is to be assigned to the second device comprises: determining that the first role is to be assigned to the first device and the second role is to be assigned to the second device based at least on prior role assignment information for the first device and the second device.

In a further embodiment of the foregoing method, determining that the first role is to be assigned to the first device and the second role is to be assigned to the second device comprises: determining that the first role is to be assigned to the first device and the second role is to be assigned to the second device based at least on one historical role usage model.

In a still further embodiment of the foregoing method, determining that the first role is to be assigned to the first device and the second role is to be assigned to the second device comprises: determining that the first role is to be assigned to the first device and the second role is to be assigned to the second device based at least on user preference information received via one or more of a user interface of the first device and a user interface of the second device.

In another embodiment of the foregoing method, determining that the first role is to be assigned to the first device and the second role is to be assigned to the second device comprises: determining that the first role is to be assigned to the first device and the second role is to be assigned to the second device based at least on role requirement information provided by at least one application executing on the first device or second device.

A first device is also described herein. The first device includes at least one processor circuit and at least one memory that stores program code configured to be executed by the at least one processor circuit. The program code comprises a role manager that is configured to determine that a first role is to be assigned to the first device and a second role is to be assigned to a second device that is communicatively connected to the first device, to cause the first role to be assigned to the first device and the second role to be assigned to the second device, to receive information indicative of a change of capability or operational state of one or more of the first device and the second device, to determine that a role assignment swap is to be implemented based at least in part on the information and, based at least on the determination that the role assignment swap is to be implemented, to cause the first role to be assigned to the second device and causing the second role to be assigned to the first device.

In one embodiment of the first device, the first role and the second role respectively comprise: a host and a function; a power supplier and a power consumer; a master and a slave; a server and a client; a source and a sink; or an upstream or a downstream.

In another embodiment of the first device, the role manager is configured to receive information indicative of the change of operational state of one or more of the first device and the second device by receiving information indicative of one or more of: an addition, removal, activation or deactivation of a subsystem of the first device or the second device; a change of a state of a subsystem of the first device or the second device; a change of user preference input with respect to role assignment for the first device and second device; a change in configuration information of the first device or the second device; a connection or disconnection of at least a third device to or from the first device or the second device; a change of role requirements by at least one application executing on the first device or the second device; a change of power source by the first device or the second device; a change of a state of a power source currently being used to supply power to the first device or the second device; and a change in a level of consumption of a resource by the first device or the second device.

In yet another embodiment of the first device, the role manager is configured to determine that the first role is to be assigned to the first device and the second role is to be assigned to the second device by: querying the second device for capability and operational state information associated with the second device; receiving the capability and operational state information associated with the second device therefrom; obtaining capability and operational state information associated with the first device; and determining that the first role is to be assigned to the first device and the second role is to be assigned to the second device based on the capability and operational state information associated with the first device and the second device.

In still another embodiment of the first device, the role manager is configured to determine that the first role is to be assigned to the first device and the second role is to be assigned to the second device based at least on prior role assignment information for the first device and the second device.

In a further embodiment of the first device, the role manager is configured to determine that the first role is to be assigned to the first device and the second role is to be assigned to the second device based at least on one historical role usage model.

In a still further embodiment of the first device, the role manager is configured to determine that the first role is to be assigned to the first device and the second role is to be assigned to the second device based at least on user preference information received via one or more of a user interface of the first device and a user interface of the second device.

In another embodiment of the first device, the role manager is configured to determine that the first role is to be assigned to the first device and the second role is to be assigned to the second device based at least on role requirement information provided by at least one application executing on the first device or second device.

A computer program product is also described herein. The computer program product comprises a computer-readable memory having computer program logic recorded thereon that when executed by at least one processor of a first device causes the at least one processor to perform a method comprising: determining that a first role is to be assigned to the first device and a second role is to be assigned to a second device that is communicatively connected to the first device; causing the first role to be assigned to the first device and the second role to be assigned to the second device; receiving information indicative of a change of capability or operational state of one or more of the first device and the second device; determining that a role assignment swap is to be implemented based at least in part on the information; and based at least one the determining that the role assignment swap is to be implemented, causing the first role to be assigned to the second device and causing the second role to be assigned to the first device.

In one embodiment of the foregoing computer program product, the first role and the second role respectively comprise: a host and a function; a power supplier and a power consumer; a master and a slave; a server and a client; a source and a sink; or an upstream and a downstream.

In another embodiment of the foregoing computer program product, receiving information indicative of the change of operational state of one or more of the first device and the second device comprises receiving information indicative of one or more of: an addition, removal, activation or deactivation of a subsystem of the first device or the second device; a change of a state of a subsystem of the first device or the second device; a change of user preference input with respect to role assignment for the first device and second device; a change in configuration information of the first device or the second device; a connection or disconnection of at least a third device to or from the first device or the second device; a change of role requirements by at least one application executing on the first device or the second device; a change of power source by the first device or the second device; a change of a state of a power source currently being used to supply power to the first device or the second device; and a change in a level of consumption of a resource by the first device or the second device.

In yet another embodiment of the foregoing computer program product, determining that the first role is to be assigned to the first device and the second role is to be assigned to the second device comprises: querying the second device for capability and operational state information associated with the second device; receiving from the second device the capability and operational state information associated with the second device; obtaining capability and operational state information associated with the first device; and determining that the first role is to be assigned to the first device and the second role is to be assigned to the second device based on the capability and operational state information associated with the first device and the second device.

VI. CONCLUSION

While various embodiments have been described above, it should be understood that they have been presented by way of example only, and not limitation. It will be apparent to persons skilled in the relevant art(s) that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

For example, although embodiments described herein are described as assigning one of two different roles to each of two devices in accordance with a particular dual-role assignment scheme, it will be appreciated by persons skilled in the relevant art(s) that the techniques described herein can be used to assign multiple roles to each device in accordance with multiple dual-role assignment schemes. For example, in an embodiment, techniques similar to those described above may be used to assign the roles of USB host and USB function to a pair of interconnected devices as well as to assign the roles of power provider and power consumer to the same pair of devices. In fact, any number of different dual-role assignment schemes may be concurrently supported and applied to the same pair of devices. Furthermore, such embodiments may operate to dynamically swap any of the various role assignments based on observed changes in capability or operational state.

As another example, although embodiments described herein are described as assigning one of two different roles to each of two devices in accordance with a particular dual-role assignment scheme, it will be appreciated by persons skilled in the relevant art(s) that the techniques described herein can be used to assign roles to multiple interconnected devices in accordance with role assignment schemes that provide for three or more roles. Examples of such role assignment schemes may include for example a scheme that respectively assigns host, device, and bridge/hub/passthrough roles to various interconnected devices or a scheme that respectively assigns power source, power sink and no power (neither powers the other) to various interconnected devices. However, these examples are provided for the sake of illustration only and are not intended to be limiting.

What is claimed is:

1. A method performed by a software-implemented role manager executing on a first device that is communicatively connected to a second device, comprising:
    determining that a first role is to be assigned to the first device and a second role is to be assigned to the second device, the first role and the second role defining an operating relationship between the first device and second device;
    causing the first role to be assigned to the first device and the second role to be assigned to the second device;
    receiving information indicative of a change of capability or operational state of one or more of the first device and the second device;
    determining that a role assignment swap is to be implemented based at least in part on the information; and
    based at least on the determining that the role assignment swap is to be implemented, initiating the role assignment swap causing the first role to be assigned to the second device and causing the second role to be assigned to the first device, the initiating comprising causing a connector manager to:
        assign the second role to the first device by selectively activating one of a first driver stack or a second driver stack of the first device; and
        assign the first role to the second device by interacting with the second device.

2. The method of claim 1, wherein the first role and the second role respectively comprise:
    a host and a function;
    a power supplier and a power consumer;
    a master and a slave;
    a server and a client;
    a source and a sink; or
    an upstream and a downstream.

3. The method of claim 1, wherein receiving information indicative of the change of capability or operational state of one or more of the first device and the second device comprises receiving information indicative of one or more of:
    an addition, removal, activation or deactivation of a subsystem of the first device or the second device;
    a change of a state of a subsystem of the first device or the second device;
    a change of user preference input with respect to role assignment for the first device and second device;
    a change in configuration information of the first device or the second device;
    a connection or disconnection of at least a third device to or from the first device or the second device;
    a change of role requirements by at least one application executing on the first device or the second device;
    a change of power source by the first device or the second device;
    a change of a state of a power source currently being used to supply power to the first device or the second device; and
    a change in a level of consumption of a resource by the first device or the second device.

4. The method of claim 1, wherein determining that the first role is to be assigned to the first device and the second role is to be assigned to the second device comprises:
    querying the second device for capability and operational state information associated with the second device;
    receiving from the second device the capability and operational state information associated with the second device;
    obtaining capability and operational state information associated with the first device; and
    determining that the first role is to be assigned to the first device and the second role is to be assigned to the second device based on the capability and operational state information associated with the first device and the second device.

5. The method of claim 1, wherein determining that the first role is to be assigned to the first device and the second role is to be assigned to the second device comprises:
    determining that the first role is to be assigned to the first device and the second role is to be assigned to the second device based at least on prior role assignment information for the first device and the second device.

6. The method of claim 1, wherein determining that the first role is to be assigned to the first device and the second role is to be assigned to the second device comprises:
    determining that the first role is to be assigned to the first device and the second role is to be assigned to the second device based at least on one historical role usage model.

7. The method of claim 1, wherein determining that the first role is to be assigned to the first device and the second role is to be assigned to the second device comprises:
    determining that the first role is to be assigned to the first device and the second role is to be assigned to the second device based at least on user preference information received via one or more of a user interface of the first device and a user interface of the second device.

8. The method of claim 1, wherein determining that the first role is to be assigned to the first device and the second role is to be assigned to the second device comprises:
    determining that the first role is to be assigned to the first device and the second role is to be assigned to the second device based at least on role requirement information provided by at least one application executing on the first device or second device.

9. A first device, comprising:
    at least one processor circuit; and
    at least one memory that stores program code configured to be executed by the at least one processor circuit, the program code comprising:

a role manager configured to:
  determine that a first role is to be assigned to the first device and a second role is to be assigned to a second device that is communicatively connected to the first device, the first role and the second role defining an operating relationship between the first device and second device;
  cause the first role to be assigned to the first device and the second role to be assigned to the second device;
  receive information indicative of a change of capability or operational state of one or more of the first device and the second device;
  determine that a role assignment swap is to be implemented based at least in part on the information;
  based at least on the determination that the role assignment swap is to be implemented, initiate the role assignment swap causing the first role to be assigned to the second device and causing the second role to be assigned to the first device, by causing a connector manager to:
    assign the second role to the first device by selectively activating one of a first driver stack or a second driver stack of the first device; and
    assign the first role to the second device by interacting with the second device.

10. The first device of claim 9, wherein the first role and the second role respectively comprise:
  a host and a function;
  a power supplier and a power consumer;
  a master and a slave;
  a server and a client;
  a source and a sink; or
  an upstream and a downstream.

11. The first device of claim 9, wherein the role manager is configured to receive information indicative of the change of operational state of one or more of the first device and the second device by receiving information indicative of one or more of:
  an addition, removal, activation or deactivation of a subsystem of the first device or the second device;
  a change of a state of a subsystem of the first device or the second device;
  a change of user preference input with respect to role assignment for the first device and second device;
  a change in configuration information of the first device or the second device;
  a connection or disconnection of at least a third device to or from the first device or the second device;
  a change of role requirements by at least one application executing on the first device or the second device;
  a change of power source by the first device or the second device;
  a change of a state of a power source currently being used to supply power to the first device or the second device; and
  a change in a level of consumption of a resource by the first device or the second device.

12. The first device of claim 9, wherein the role manager is configured to determine that the first role is to be assigned to the first device and the second role is to be assigned to the second device by:
  querying the second device for capability and operational state information associated with the second device;
  receiving the capability and operational state information associated with the second device therefrom;
  obtaining capability and operational state information associated with the first device; and
  determining that the first role is to be assigned to the first device and the second role is to be assigned to the second device based on the capability and operational state information associated with the first device and the second device.

13. The first device of claim 9, wherein the role manager is configured to determine that the first role is to be assigned to the first device and the second role is to be assigned to the second device based at least on prior role assignment information for the first device and the second device.

14. The first device of claim 9, wherein the role manager is configured to determine that the first role is to be assigned to the first device and the second role is to be assigned to the second device based at least on one historical role usage model.

15. The first device of claim 9, wherein the role manager is configured to determine that the first role is to be assigned to the first device and the second role is to be assigned to the second device based at least on user preference information received via one or more of a user interface of the first device and a user interface of the second device.

16. The first device of claim 9, wherein the role manager is configured to determine that the first role is to be assigned to the first device and the second role is to be assigned to the second device based at least on role requirement information provided by at least one application executing on the first device or second device.

17. A computer program product comprising a computer-readable memory having computer program logic recorded thereon that when executed by at least one processor of a first device causes the at least one processor to perform a method comprising:
  determining that a first role is to be assigned to the first device and a second role is to be assigned to a second device that is communicatively connected to the first device, the first role and the second role defining an operating relationship between the first device and second device;
  causing the first role to be assigned to the first device and the second role to be assigned to the second device;
  receiving information indicative of a change of capability or operational state of one or more of the first device and the second device;
  determining that a role assignment swap is to be implemented based at least in part on the information; and
  based at least on the determining that the role assignment swap is to be implemented, initiating the role assignment swap causing the first role to be assigned to the second device and causing the second role to be assigned to the first device, the initiating comprising causing a connector manager to:
    assign the second role to the first device by selectively activating one of a first driver stack or a second driver stack of the first device; and
    assign the first role to the second device by interacting with the second device.

18. The computer program product of claim 17, wherein the first role and the second role respectively comprise:
  a host and a function;
  a power supplier and a power consumer;
  a master and a slave;
  a server and a client;
  a source and a sink; or
  an upstream or a downstream.

19. The computer program product of claim 17, wherein receiving information indicative of the change of operational state of one or more of the first device and the second device comprises receiving information indicative of one or more of:
- an addition, removal, activation or deactivation of a subsystem of the first device or the second device;
- a change of a state of a subsystem of the first device or the second device;
- a change of user preference input with respect to role assignment for the first device and second device;
- a change in configuration information of the first device or the second device;
- a connection or disconnection of at least a third device to or from the first device or the second device;
- a change of role requirements by at least one application executing on the first device or the second device;
- a change of power source by the first device or the second device;
- a change of a state of a power source currently being used to supply power to the first device or the second device; and
- a change in a level of consumption of a resource by the first device or the second device.

20. The computer program product of clam 17, wherein determining that the first role is to be assigned to the first device and the second role is to be assigned to the second device comprises:
- querying the second device for capability and operational state information associated with the second device;
- receiving from the second device the capability and operational state information associated with the second device;
- obtaining capability and operational state information associated with the first device; and
- determining that the first role is to be assigned to the first device and the second role is to be assigned to the second device based on the capability and operational state information associated with the first device and the second device.

* * * * *